United States Patent [19]

May

[11] Patent Number: 5,043,721
[45] Date of Patent: Aug. 27, 1991

[54] PAGING ACCESSORY FOR PORTABLE INFORMATION/COMPUTING DEVICES

[75] Inventor: Gregory J. May, Corvallis, Oreg.

[73] Assignee: Hewlett-Packard Company, Palo Alto, Calif.

[21] Appl. No.: 454,662

[22] Filed: Dec. 18, 1989

[51] Int. Cl.⁵ .............................................. H04B 7/00
[52] U.S. Cl. .......................... 340/825.44; 340/311.1; 364/705.01; 364/705.05
[58] Field of Search ........................ 340/311.1, 825.44; 364/705.01, 705.05, 705.06, 705.07, 708, 709.01; 379/56, 57, 90, 93, 96, 100, 110; 455/66, 89, 90, 128, 346, 348, 351, 344, 347; 368/10; 358/84

[56] References Cited

U.S. PATENT DOCUMENTS

| | | | |
|---|---|---|---|
| 3,976,995 | 8/1976 | Sebestyen | 455/351 |
| 4,306,294 | 12/1981 | Hashimoto et al. | 364/705.05 |
| 4,548,510 | 10/1985 | Levine | 368/72 |
| 4,696,054 | 9/1987 | Tsugei et al. | 455/89 |
| 4,748,574 | 5/1988 | Tuchto | 364/705.05 |
| 4,750,036 | 6/1988 | Martinez | 358/84 |
| 4,779,138 | 10/1988 | Nomura et al. | 364/705.05 |
| 4,872,005 | 10/1989 | DeLuca et al. | 368/10 |
| 4,903,222 | 2/1990 | Carter et al. | 364/708 |
| 4,935,745 | 6/1990 | Mori et al. | 455/89 |
| 4,955,084 | 9/1990 | Umetsu et al. | 455/347 |

Primary Examiner—Donald J. Yusko
Assistant Examiner—Dervis Magistre

[57] ABSTRACT

A paging accessory (10) for portable computing devices (12) such as calculators, electronic notebooks, calendars or the like. The paging accessory (10) includes a board (14) on which are mounted a receiver (32) for receiving page signals and a microprocessor (34) for identifying and decoding a page signal intended for the accessory (10). The board (14) includes connectors (16) for inserting the accessory (10) into a port (15) of a portable computing device (12). Alternatively, receiver (32) may be incorporated directly into a device (12). The device (12) is programmed to compare information in its memory. For example, it can compare a received phone number against a list of phone numbers to identify the person to be called in response to the page.

17 Claims, 3 Drawing Sheets

PAGING ACCESSORY FOR PORTABLE INFORMATION/COMPUTING DEVICES

BACKGROUND OF THE INVENTION

This invention relates to portable computing devices, such as calculators, electronic information managers or electronic schedulers, which are usually carried on the person or otherwise kept close at hand. More particularly, this invention relates to a paging accessory for portable computing devices. This accessory, which couples to the portable computing device or may be incorporated directly therein, provides paging capability without the need for an additional, separate pager to be carried about.

Portable computing devices, such as calculators, are sized to be conveniently carried. For technical, sales and business persons especially, the small size is an important feature because of the need to keep such a device close at hand during the work day. Other portable computing devices, such as electronic notepads, information managers or electronic schedulers, are now being developed that keep track of appointments entered by the user. These devices, collectively referred to herein as portable computing devices, will also be sized so that they may be kept on the person.

One desirable feature that such portable computing devices lack is paging. Presently, personal paging requires a separate pager that must be carried in addition to the portable computing device. Not only is this inconvenient, but such pagers have the further drawback that they only permit the receiving, but not the sending, of text messages. Currently, sending a text message to a pager requires one to call an operator for assistance or to have access to a keyboard adapted for sending a text message.

SUMMARY OF THE INVENTION

An object of the invention, therefore, is to provide paging capability in a portable computing device.

Another object of the invention is to provide such capability in an accessory that may be coupled to a conventional portable computing device to take advantage of components present in the device.

Yet another object of the invention is to provide paging transmission capability that also takes advantage of existing components of the portable computing device.

In accordance with the invention, a paging accessory for a portable computing device includes a receiver for receiving a page signal and a base for mounting and interconnecting the receiver and other components of the paging accessory. The base includes connectors for connecting the accessory to a portable computing device, such as a calculator, to transmit signals between the paging accessory and device. In one embodiment, the accessory may also include a control means for decoding a received page signal. The accessory control means is programmed to communicate the page signal to the control means of the portable computing device for storage or display by the device.

The paging accessory in another embodiment may also include memory for storing received page messages and a battery for providing power to the accessory. This power enables the accessory to receive and store page messages in memory while the accessory is disconnected from the portable computing device, which otherwise may be a power source.

Another feature of the paging accessory is an ability to alert the user when a page signal is received. The paging accessory may include audio means for signalling the reception of a page signal while the accessory is disconnected from the portable computing device. If the paging accessory is connected, however, and the computing device is off, the control means may be programmed to alert the portable computing device to power up when a page signal is received by the accessory so that the computing device can receive the page message within the signal.

For sending text messages, the paging accessory may include a modem for transmitting page signals from the portable computing device. The correctness of an original page message may be checked by adapting the accessory to receive the original page signal. The message with the received signal may then be compared against the original message to determine the correctness of the original message or to identify that the page was sent.

DETAILED DESCRIPTION

Figure 1:
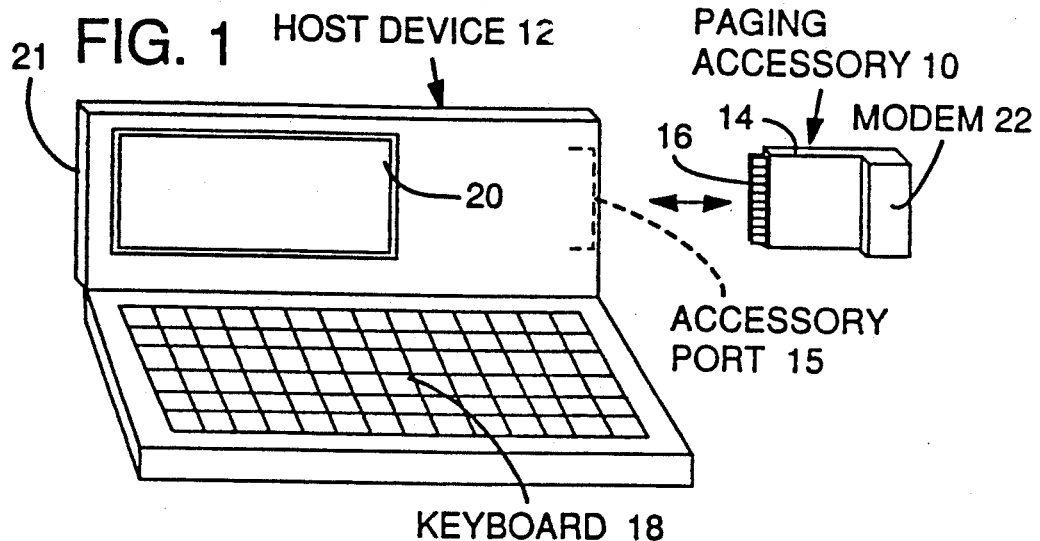
FIG. 1 is a perspective view of a paging accessory according to the invention, illustrating its relationship to a conventional portable computing device.

FIG. 1 illustrates one embodiment of a paging accessory 10 according to the invention. The paging accessory 10 is designed for connection to a host device, such as a conventional portable computing device 12, to provide the device with paging capability. The accessory may take the form of a plug-in card, module or other equivalent unit that may be connected to suitable accessory port 15 of the device 12. The components of the accessory 10, to be described, are mounted and interconnected on a base, such as a supporting board 14. The board 14 includes means, such as connectors 16, for connecting the accessory 10 to the computing device 12. Through such connectors 16, signals including instructions, data and power may be transmitted between the accessory 10 and computing device 12. The portable computing device 12, as will be described, contains typical computing components, including control means, memory, a keyboard 18, a display screen 20 contained within a housing 21, and possibly a speaker (not shown). The computing device also contains the accessory port 15 having one or more receptacles, such as slots for accepting the connectors 16 of a board 14.

The paging accessory 10 has a number of advantages over a conventional, stand-alone pager. One readily apparent from FIG. I is size. Because the paging accessory 10 can be connected to the device 12, it can utilize the power, memory, speaker and display screen 20 of the device 12 and, if desired, the control means. A stand-alone pager, in contrast, must have its own power source, memory for messages and its own display screen or speaker to alert the user.

FIG. 1 also shows an optional modem 22 that may be mounted on the board 14. The modem 22 allows use of the keyboard 18 to send pages in the form of text messages. This is a second advantage over conventional pagers, which only receive but cannot send messages. With the modem option, a user may plug into a local phone line to transmit page messages from the portable computing device 12. As an alternative, the modem 22 may be contained within the portable computing device 12 or otherwise connected to it in a conventional means such as an RS 232 port.

Figure 2:
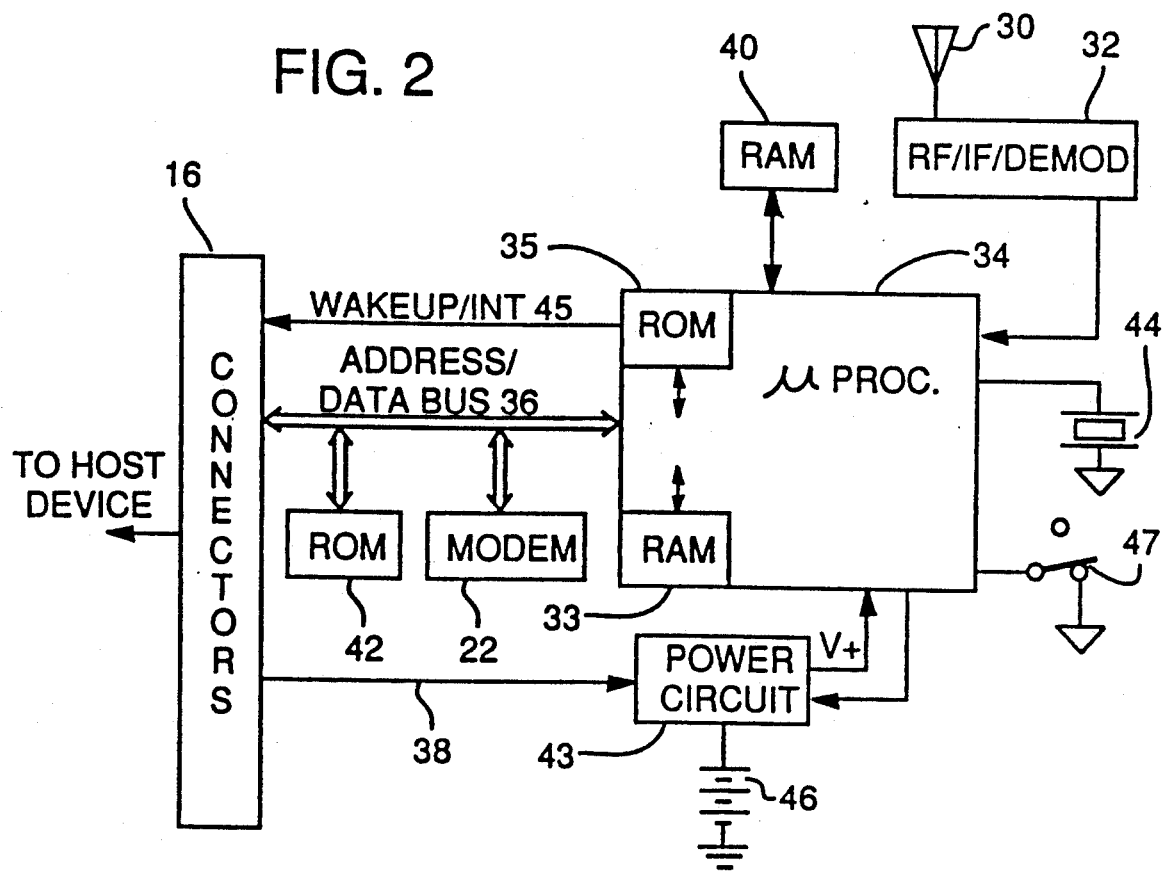
FIG. 2 is a block diagram of the paging accessory of FIG. 1.

FIG. 2 is a block diagram of one of many possible embodiments of the paging accessory 10. Page signals intended for the accessory 10 are received by an antenna 30 and associated receiver 32 that may include suitable RF, IF and demodulating stages. Accessory control means, such as a microprocessor 34 and associated circuitry, can communicate with the receiver 32 to accept the demodulated page signal. Utilizing RAM 33 and ROM 35, the microprocessor 34 is programmed to decode the received page signal and to communicate the decoded signal to the portable computing device 12 through a bus 36. Bus 36 may be a serial or parallel bus. Power is provided to the accessory 10 through a power path 38 from the device 12. To conserve power, the microprocessor is programmed to be in a standby power mode much of the time. It turns on periodically to look for a page signal and then stays on for the needed time if the accessory is receiving a page signal. Such time division multiplexing is known in the art.

FIG. 2 also shows paging ROM 42 that is connected to bus 36. This memory, which may be mounted to the board 14 or to another board, contains page handling instructions for the control means of the computing device 12. These instructions are not typically stored in the ROM of the device 12 because many of the portable computing devices 12 may never be used with an accessory 10 for paging.

For more than this basic capability, the accessory 10 may include other components. Additional backup memory 40 and a power source, such as battery 46, can be added. Memory 40 is sufficiently large to store page messages received while the accessory is disconnected from the portable computing device 12. Battery 46 provides the necessary power. Audio means, such as a beeper 44, may be provided for signaling the reception of a page signal by the disconnected accessory. To maintain power to accessory 10, a power circuit 43 switches to battery 46 from power path 38 when the device 12 is disconnected from port 15. Alternatively, power can be completely shut off to accessory 10 by actuating a switch 47 thereon. The switch 47, when disconnecting the microprocessor pin from the ground, signals the processor to shut off power and to isolate itself from the bus 36. Modem 22 may also be included in the accessory 10 and connected to bus 36 for transmitting page messages from the portable computing device. The housing 21 of the device 12 may also be utilized as the antenna 30 to minimize the size and cost of the paging accessory 10. Other potential antennas include the device 12 shielding or traces within the device 12.

Additional capability can be added through further programming of the microprocessor 34. For example, the microprocessor may be programmed to "wake up" a turned off portable computing device upon the reception of a page signal. This "wake up" signal may be sent along a wake up/interrupt path 45, as shown in FIG. 2, directly to the control means of the device 12.

Figure 3:
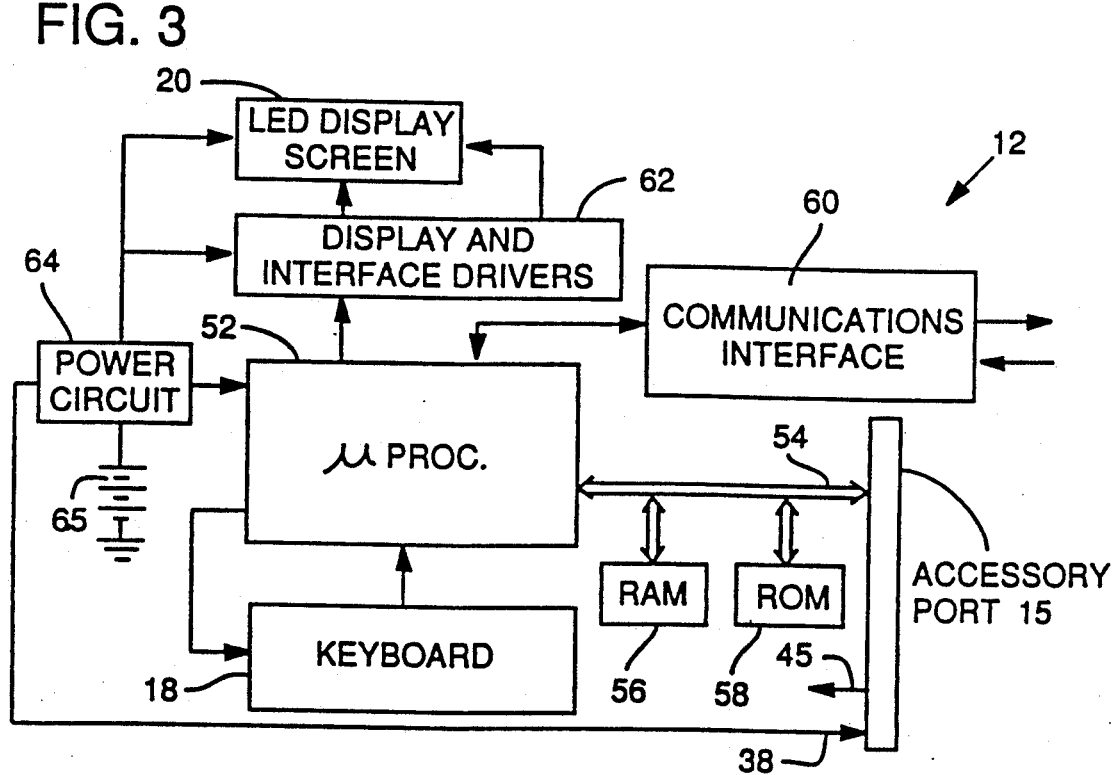
FIG. 3 is a block diagram of a computing device for use with the paging accessory.

FIG. 3 is a block diagram of a portable computing device 12 that includes the accessory port 15. The device 12 is otherwise of conventional design and may be a calculator, electronic calendar, electronic notebook, etc., that shares the disclosed or equivalent structure. The components of the device 12 include the display screen 20 and keyboard 18, as well as control means, such as a microprocessor 52 with its associated circuitry (not shown). Other components well known in the art include a bus 54, RAM 56 for storing data, ROM 58 for storing instructions and a communications interface 60, such as an RS 232 port. The interface 60 would connect to modem 22 if the modem were associated with the device 12 rather than the accessory 10. If desired, the paging instructions for paging accessory may be stored in other memory, such as ROM 58 or other memory, eliminating the need for ROM 42. Coupled between the display screen 20 and microprocessor 52 are display interface and drivers 62. Power is provided through power circuit 64 connected to a battery 65 or some other power source, such as AC.

For operation of the device 12 in response to reception of a page signal, the paging accessory 10 is connected to accessory port 15 and buses 36 and 54 are thus joined. Assume accessory 10 has received a page signal. Microprocessor 34 identifies and decodes the page signal. Processor 34 then wakes up the host device 12 and sends the page message, the information, to the device. The information may be stored in RAM 56. Depending on the programming of the microprocessor 52, several options are possible. The microprocessor 52 may compare the page information against other information stored in memory while signalling to the user that a page has been received. This is a third advantage of the present invention over conventional pagers, which lack this capability. For example, the page information may be a phone number to be compared with a list of phone numbers in memory to identify the person to be called in response to the page signal. This contrasts with just displaying the phone number, as conventional pagers do. Or the page information may be a requested appointment to be compared with a list of appointments stored in memory to determine if such appointment could be scheduled. If so, the device 12 would then signal the user for approval of the appointment request. The microprocessor 52 may also be programmed to alert the user to a page signal and then either immediately display its message or display it only in response to a user prompt. With a modem 22 available either with device 12 or as part of accessory 10, processor 52 may also be programmed to check the correctness of pages sent via the device 12. Receiver 32 is adapted to receive pages sent from device 12, and processor 52 may then compare the received message with the original message sent from device 12 to verify its correctness or that it was, in fact, sent. Several page messages may also be stored in RAM 56, called up as a group by the user and erased selectively, as with conventional pagers. In short, microprocessor 52 may be programmed to provide any feature of a conventional pager, as well as additional ones mentioned above, which are beyond such a pager's capability.

It should be understood that, alternatively, the paging capability of accessory 10 may be incorporated directly into the device 12. This requires mounting receiver 32 within the portable computing device.

Figure 4:
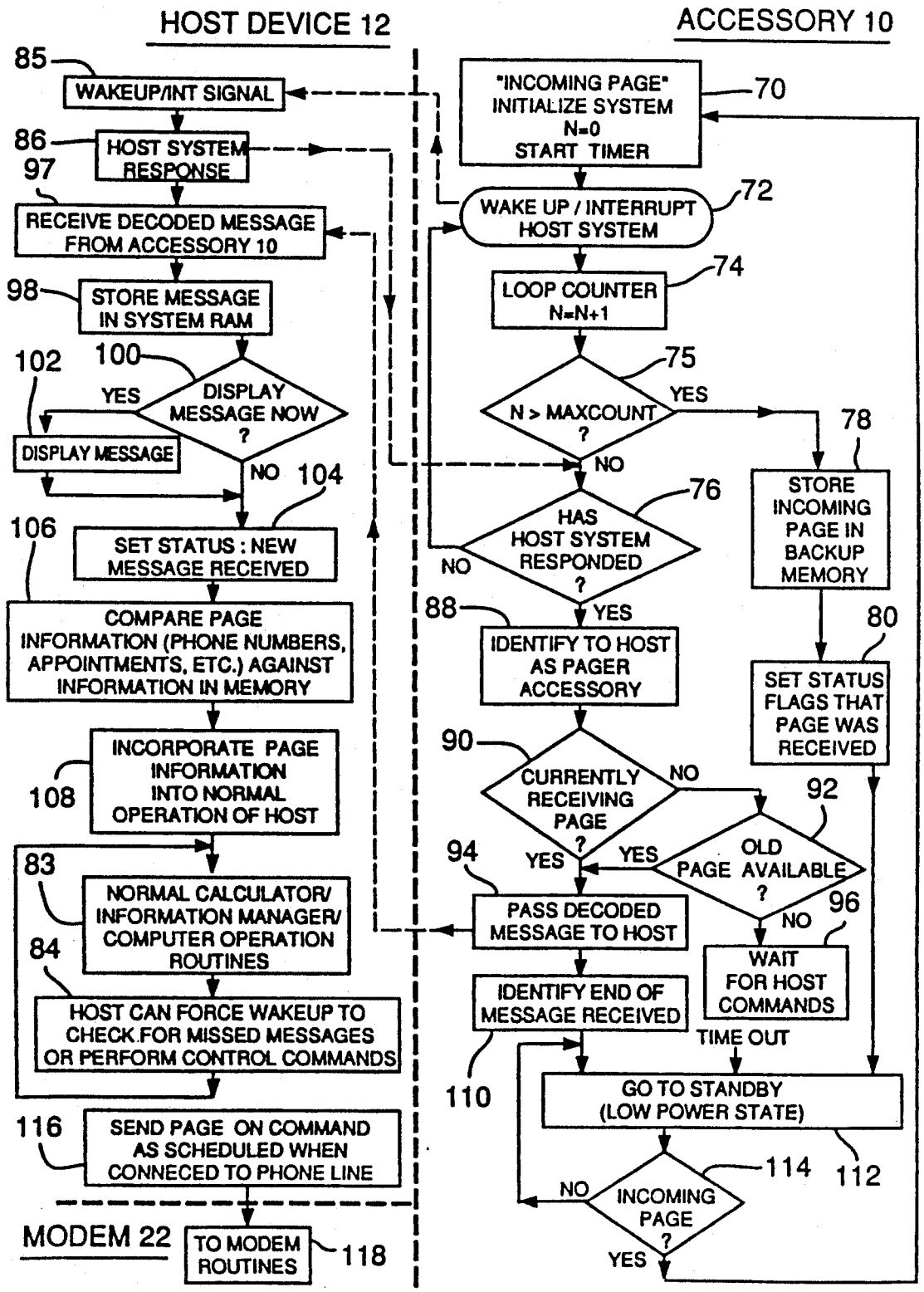
FIG. 4 is a flowchart illustrating the programmed operation of the paging accessory and of the portable computing device.

FIG. 4 is a flowchart illustrating a portion of the programmed operation of the microprocessor 34. It further illustrates a portion of the programmed operation of the microprocessor 52 on the host device 12 in response to a received paging signal. Initially, microprocessor 34 turns on periodically as part of its operation to determine if the accessory 10 is receiving a page (112-114 loop). Upon detection of an incoming page signal, the microprocessor 34 initializes a counter to 0, puts the accessory in a high power mode and starts a timer (70). This timer, if it times out, moves the accessory 10 from the high power mode back into a standby power mode after a predetermined time (112). The predetermined time is sufficient to enable reception of a legitimate page signal while preventing the accessory from being locked in a high power mode for too long. The processor 34 immediately alerts device 12 that a page signal has arrived, causing the device to wake up (72). A loop counter is then incremented and checked (74, 75) for determining if the device 12 has responded (76). It might not respond, for example, if the accessory 10 is disconnected from the device 12. In that event, the page signal is stored in the accessory memory (78) and a status flag that a page signal was received is set (80). Additionally, as described, an audio alarm may sound.

The device 12, if connected, may be off or in normal operation (83). As part of its normal operation, it may be programmed to periodically wake up to check for missed messages or perform certain commands (84). Processor 34 alerts device 12 that a page has been received by generating a wake up interrupt signal (85). Host device 12 then responds when ready to receive the message (86). The accessory 10 then identifies itself to the device 12 (88) and determines if it, the accessory, is currently receiving the page (90). If not, the processor 34 checks if previously stored, "old" pages are present for transfer to the device 12 (92) and transfers such messages (94). If there are no old page messages, microprocessor 34 may wait for commands from the device 12, if any, for a period of time (96). If the accessory is currently receiving a page (90) on the other hand, the message is immediately passed to the device 12 (94). The device 12 then receives the message (97) and stores it in its memory (98). The message is then displayed, depending on whether the device 12 is busy or programmed not to display until a predetermined time (100, 102). In either event, device 12 acknowledges receipt of the message (104). It may then compare the information within the page against other information in its memory (106) for purposes already described. It can also incorporate the page information into the normal operation of the host (108) before continuing with its normal, nonpaging operations (84).

The processor 34 notifies the device 12 when the page signal is complete (110) and places the accessory in the low power standby mode to conserve power (112). It remains in that mode until it wakes up as part of its periodic operation to determine if it is receiving another page signal (114).

The modem 22 in the present embodiment is controlled by the processor 52 of the device 12. As shown in FIG. 4, processor 52 may be programmed to send out an intended page signal whenever it senses a connection to a phone line (116). In this way, a page message may be entered via keyboard 20 and is automatically sent whenever the phone line is connected to the modem 22 (118).

FIG. 4 is intended only to illustrate the basic paging operations of the accessory 10 and device 12. Other features are described sufficiently herein, such that one skilled in the art could produce these features without the need for additional illustration.

Having described and illustrated the principles of my invention with reference to a preferred embodiment, it should be apparent that the invention can be modified in arrangement and detail without departing from such principles. For example, the control means within the accessory 10 need not be a programmed microprocessor, but can be hard-wired logic capable of performing the desired functions. Alternatively, microprocessor 34 may be dispensed with and its responsibilities taken over by microprocessor 52 or other control means within the host device 12. The illustrated embodiment should, therefore, be considered as an example only and not as a limit on the scope of the invention. My invention includes any embodiment as may come within the scope and spirit of the following claims.

I claim:

1. A paging accessory for a portable computing device, comprising:
   a receiver for receiving a page signal including information comprising a phone number or textual message;
   a base for mounting and interconnecting components of the paging accessory including the receiver, the base including connectors for connecting the accessory to a portable computing device to transmit signals between the paging accessory and device, the portable computing device having control means, memory and a display screen;
   accessory memory connected to the base for storing paging instructions for the control means of the portable computing device and for storing a plurality of received page signals; and
   accessory control means connected to the base and in communication with the receiver for decoding a received page signal intended for the accessory, the accessory control means being able to communicate the decoded page signal to the portable computing device,
   the control means of the portable computing device being adapted to read the accessory memory to obtain the paging instructions for communicating with the paging accessory.

2. The paging accessory of claim 1 wherein the accessory control means comprises a microprocessor.

3. The paging accessory of claim 1 including audio means for signalling the reception of a page signal while the accessory is disconnected from the portable computing device.

4. The paging accessory of claim 1 including a modem for transmitting page signals from the portable computing device.

5. The paging accessory of claim 1 wherein the portable computing device includes a housing which couples to the accessory to provide an accessory antenna for receiving page signals.

6. The paging accessory of claim 1 including memory for containing page handling instructions for the portable computing device.

7. A paging accessory for a portable computing device, comprising:
   a receiver for receiving a page signal including information comprising a phone number or textual message;
   a base for mounting and interconnecting components of the paging accessory including the receiver, the base including connectors for connecting the accessory to a portable computing device to transmit signals between the paging accessory and the device, the portable computing device having control means, memory and a display screen;

access memory connected to the base for storing a plurality of received page signals; and accessory control means connected to the base and in communication with the receiver for decoding a received page signal intended for the accessory, for communicating decoded page signal to the portable computing device, and for alerting the portable computing device to move from one operating state to another operating state when a page signal is received by the accessory.

8. A portable computing device with paging capability, comprising:

display means for displaying information;

memory for storing information including data and instructions;

a keyboard for entering information for calculations or for generating page signals including information comprising a phone number or textual message;

a modem for transmitting pages entered via the keyboard of the device;

a receiver for receiving a page signal including information comprising a phone number or textual message; means for switching the portable computing device between a computing mode and a paging mode of operation; and control means in communication with the display means, memory, keyboard and receiver for decoding a received page signal to extract its information, for storing the page information in a memory location, for comparing the page information against information stored in memory, and for displaying a received phone number or textual message on the display means when the portable computing device is in the paging mode, and for performing calculations and displaying their results when said device is in the computing mode.

9. The portable computing device of claim 8 wherein the display means comprises a display screen.

10. The portable device of claim 8 wherein the stored information to be compared by the control means comprises a list of appointments, the control means adapted for comparing a phone number contained within the page information with a list of phone numbers stored in memory to identify the person to be called in response to the page.

11. The portable computing device of claim 8 wherein the stored information to be compared by the control means comprises a list of appointments, the control means adopted for comparing a textual message comprising an appointment request contained within the page information with the list of appointments to determine if such appointment could be scheduled.

12. The portable computing device of claim 8 wherein the control means is adapted to compare a page message transmitted via the modem against a page message received by the receiver to determine the correctness of the transmitted page.

13. The method of claim 12 including providing a modem with the computing device, transmitting page messages entered via a keyboard of the device, and comparing a page message transmitted via the modem against the received page message to determine the correctness of the transmitted page message.

14. A method of paging the user of a portable computing device, comprising:

providing a portable computing device with a receiver for receiving pages including information comprising a phone number or textual message;

interrupting the portable computing device in response to reception of a page;

decoding a received page to determine the information therein;

alerting the user that a page has been received; and in response to a user request, displaying the phone number or textual message on a viewing screen of the portable computing device.

15. The method of claim 14 including comparing a phone number contained within the page information with a list of phone numbers stored in memory to identify the person to be called in response to the page.

16. The method of claim 14 including comparing an appointment request contained within the page information with a list of appointments stored within memory to determine if such appointment could be scheduled.

17. The paging accessory of claim 7 wherein the portable computing device is alerted to move from a lower power operating state to a higher power operating state.

* * * * *